(12) United States Patent
Lindskog et al.

(10) Patent No.: US 8,542,607 B2
(45) Date of Patent: Sep. 24, 2013

(54) ENHANCED RECOVERY PROCEDURE

(75) Inventors: Jan Lindskog, Pixbo (SE); Roger Wallerius, Sävedalen (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 302 days.

(21) Appl. No.: 12/991,709

(22) PCT Filed: May 22, 2008

(86) PCT No.: PCT/EP2008/056324
§ 371 (c)(1),
(2), (4) Date: Nov. 9, 2010

(87) PCT Pub. No.: WO2009/141010
PCT Pub. Date: Nov. 26, 2009

(65) Prior Publication Data
US 2011/0058497 A1    Mar. 10, 2011

(51) Int. Cl.
*H04L 12/26*   (2006.01)
(52) U.S. Cl.
USPC ............................ 370/252; 370/394; 370/469
(58) Field of Classification Search
USPC .......................................... 370/252, 394, 469
See application file for complete search history.

(56) References Cited

U.S. PATENT DOCUMENTS

| | | | |
|---|---|---|---|
| 7,187,677 B2 * | 3/2007 | Torsner et al. | 370/394 |
| 7,363,046 B2 * | 4/2008 | Beecher | 455/513 |
| 7,440,740 B2 * | 10/2008 | Mogensen | 455/280 |
| 7,539,497 B2 * | 5/2009 | Beale | 455/451 |
| 7,616,677 B2 * | 11/2009 | Koo et al. | 375/141 |
| 7,742,483 B2 * | 6/2010 | Gessner et al. | 370/395.52 |
| 2007/0300120 A1 * | 12/2007 | Kim et al. | 714/749 |

* cited by examiner

*Primary Examiner* — Andrew Chriss
*Assistant Examiner* — Romani Ohri

(57) ABSTRACT

A method and apparatus is provided for performing normal reordering or timer based stall avoidance or window based stall avoidance, for instance for a 3GPP HSPDA compliant user entity; the method furthermore comprising the steps of deriving an accumulated quality measure pertaining to the packet data being communicated from the transmitter entity to the receiver entity; comparing the accumulated quality measure with a predetermined threshold value; if the accumulated quality measure meets predefined criteria, moving the window corresponding to the highest received value forward to a position corresponding to the received sequence number; and setting the next expected value in the receiver window forward to a position corresponding to a rear position of the window determined by the window size.

24 Claims, 12 Drawing Sheets

FIG. 3 - UE

|  | time | 1 | 2 | 3 | 4 | 5 | 6 | 7 | 8 | 9 | 10 | 11 | 12 |
|---|---|---|---|---|---|---|---|---|---|---|---|---|---|
|  | RNTI | UEn |  |  | UEn |  | UEn | UEn | UEn |  | UEn |  | UEn |
|  | CHANNEL QUALITY | HIGH |  |  | HIGH |  | LOW | LOW | LOW |  | LOW |  | HIGH |
|  | TIME |  |  |  |  |  | t1 |  |  |  |  |  | t2 |
|  |  |  |  |  |  |  |  |  |  |  |  |  |  |
| PRIOR ART | TSN | 0 |  |  | 1 |  | 2 |  |  |  | 40 |  | 41 |
| | ACK | ACK |  |  | ACK |  | DTX |  |  |  | DTX |  | ACK |
| | NE | 1 |  |  | 2 |  | 2 |  |  |  | 2 |  | 2 |
| | HR | 0 |  |  | 1 |  | 1 |  |  |  | 1 |  | 1 |
|  |  |  |  |  |  |  |  |  |  |  |  |  |  |
| INV | TSN | 0 |  |  | 1 |  | 2 |  |  |  | 40 |  | 41 |
| | ACK | ACK |  |  | ACK |  | DTX |  |  |  | DTX |  | ACK |
| | NE | 1 |  |  | 2 |  | 2 |  |  |  | 2 |  | 10 |
| | HR | 0 |  |  | 1 |  | 1 |  |  |  | 1 |  | 41 |
| | WD. SUSP. FLAG | FALSE |  |  | FALSE |  | FALSE |  |  |  | TRUE |  | TRUE |

FIG. 14

ENHANCED RECOVERY PROCEDURE

TECHNICAL FIELD

The present invention relates to operating a receiver entity adapted for receiving and acknowledging the reception of packet data units from a transmitter entity according to an automatic repeat request process and wherein in-sequence delivery of packet data units from a media access protocol layer to a higher protocol layer in the receiver is performed.

More particularly, the invention concerns signaling between a user entity (UE), a radio base station (Node-B) and a radio network controller (RNC). Still more specifically, the invention pertains to HSDPA (High Speed Downlink Packet data Access) traffic making use of among others the MAC-hs (Medium Access Control High Speed) and RLC (Radio Link Control Layer) data transmission protocols.

BACKGROUND

HSDPA provides high speed downlink access from an UMTS base station (Node B) to a plurality of user entities by flexible allocation of downlink resources.

In prior art document WO2005/034418 FIG. 3 and FIG. 5, the protocol layers involved in the communication between user entity (e.g. mobile station), Node B (base station), and RNC (implemented by parts CRNC, and SRNC) have been shown. The user entity involves the following layers: PHY (physical layer), MAC-hs (HSDPA Media Access Control layer), MAC_d (Medium Access Control Device) and a RLC (Radio Link Control layer). Node B communicates via the MAC-hs layer with the user entity and via a frame protocol HS_DSCH-FP with the RNC, respectively.

According to the HSDPA specifications, the RLC operates above the MAC-hs protocol in the protocol stack. The RLC layer provides the connection to upper communication layers such as TCP/IP, both in the user entity and in the RNC. Both the RLC protocol and the MAC-hs protocol are ARQ (Automatic Repeat Request) protocols featuring retransmissions of incorrectly received protocol data units.

As the name implies, the High Speed Downlink Packet Access (HSDPA) technology introduced in 3GPP provides substantial data capacity advantages. The technical specification 3GPP TS 25.321 concerns the MAC (Media Access Control) architecture and the various entities from a functional point of view. 3GPP 25.211 basically describes how information from the MAC-layers is mapped onto the channels transmitted on the air.

In contrast with release 99 (GSM/EDGE) which exclusively defines channels between the RNC and the UE, HSDPA introduced the HS-DSCH (High Speed Dedicated Shared Channel) channel which are terminated between the user entity and the base station set (NODE B), also denoted Node B. The HSDPA Medium Access Control (MAC-hs) enables increased packet data throughput due to link adaptation (Adaptive Modulation Coding—e.g. QAM or QPSK) and fast physical layer retransmission combining. Hence, besides incorporating the WCDMA access technology, Node B carries out scheduling and Hybrid Automatic Repeat Request (HARQ) retransmissions on the channel between the user entity and Node B. The benefits and the features of the above system have for instance been described in "WCDMA evolved—High Speed packet data services", by Stefan Parkwall et al., Ericsson review No. 2, 2003.

The RLC Layer

As explained in WO2008/007170, the RLC layer in 3GPP can operate in three modes, transparent mode, unacknowledged mode and acknowledged mode (AM), which will be focused upon in the following.

In AM mode, incorrectly received PDU's (Protocol Data Units) discovered by the receiving side are effected to be retransmitted by the transmitting side by means of an ARQ (Automatic Repeat Request) protocol.

An AM RLC entity consists of a transmitting side, and a receiving side, where the transmitting side of the AM RLC entity transmits RLC PDU's and the receiving side of the AM RLC entity receives RLC PDU's.

An AM RLC entity resides in the UE (user equipment) and in the RNC (radio network control), respectively. The transmitting side segments RLC SDU's (service data units) into PDU's of a fixed length. The receiving side reassembles received PDU's into RLC SDU's and transmits these to higher data layers. Likewise, SDU's are received from the layer above the RLC layer. In AM mode, the RLC layer is responsible for the delivery of SDU's in-sequence order.

To facilitate the in-sequence delivery, each RLC PDU is given a sequence number, 0-4095, whereby the transmitter transmits PDU's with increasing sequence number modulo 4096. Using the sequence number, the receiver can detect a missing PDU. The receiver can be configured to transmit a STATUS message upon the detection of a missing PDU. The STATUS report may contain positive or negative acknowledgement of individual RLC PDU's received by the peer RLC entity. The transmitter can also request a STATUS messages from the receiver by setting a Poll flag in the PDU header. The conditions for the transmitter to set the Poll flag are among others:

Last PDU in buffer.

When only one PDU exists in the input buffer.

Poll timer expires.

When the timer_poll expires, that is, the transmitter requested a STATUS earlier and initiated a timer_poll to reassure that a response will be received.

Window based.

A transmitter is restricted in the amount of "outstanding data" it can transmit until a STATUS confirms the reception to the receiving side. "Outstanding data" relates to the earliest unacknowledged PDU.

Note that the above description of the functionality of the RLC layer only constitutes a small excerpt of those features actually provided.

Selective retransmissions are possible, e.g. if STATUS message indicates PDU with sequence number (SN) 3, 6 and 13 are missing, only 3, 6 and 13 needs to be retransmitted.

MAC-hs Layer

In the following exemplary description regarding the MAC-hs layer:

the MAC-hs transmitter is the Node-B.

the MAC-hs receiver is the UE equipment being either a mobile station or a pc-card attached to a PC or any other equipment capable of receiving downlink 3GPP HSDPA traffic.

MAC-hs PDU's are numbered by modulo TSN (Transport Sequence Number) cycling through the field 0 to 63.

As mentioned above, the MAC-hs protocol provides multiple Hybrid-ARQ processes (HARQ) whereby for each HARQ process, the transmitter transmits a MAC-hs PDU and awaits either an ACK indicative of reception at the receiver or Negative Acknowledgement (NACK) indicative that the receiver did not receive the MAC-hs PDU or absence of a response (DTX). The round trip time, concerning the time from MAC-hs PDU transmission until reception of the feedback (ACK/NACK), is fixed. Upon the reception of a NACK or DTX, the MAC-hs transmitter retransmits the MAC-hs PDU. Since the round trip time is long in relation to the MAC-HS TTI (transmission time interval), i.e. 2 ms, and since multiple users may be adapted to receive packets in time multiplexed fashion, multiple HARQ processes are provided. If only one HARQ process was available, the duty cycle (i.e. actual transmission time/total possible transmission time) would be low. By using multiple HARQ processes, one HARQ process can await a response, while another HARQ process, or multiple HARQ processes, may transmit. Thereby, the duty cycle can be rendered close to 100 percent.

The MAC-hs protocol is semi-reliable, that is, the MAC-hs transmitter may choose to discard or delete a MAC-hs PDU that has been transmitted and possibly been retransmitted to the MAC-hs receiver.

By discarding a MAC-hs for retransmission, unnecessary transmissions are prevented over the radio link in case the MAC-hs receiver has moved to another cell or has powered down or if the receiver for any other reason is not capable of receiving data. Therefore, buffered packets are discarded at the transmitter either at the expiry of a timer set at a predetermined time (e.g. T1) corresponding to the first transmission of the packet in question or when a maximum number of retransmissions of the packet in question have been performed or based upon a too long waiting time in the input data buffer, whatever appears first or a combination thereof.

The MAC-hs receiver utilizes a receiver window for the purpose of mitigating the effect of unnecessary transmissions when PDU's are received in non-ascending sequence order (which can occur due to retransmissions). Whenever a MAC-hs PDU is successfully received with a TSN (Transmit Sequence Number) equal to the next expected TSN, the receiver can deliver the PDU to the RLC layer. Depending on whether the subsequent TSN number (i.e. next expected TSN+1) has already been successfully received, that MAC-hs PDU can also be delivered and so forth. The receiver window is updated accordingly. Delivery to the RLC layer from the MAC-hs protocol is done in consecutive order, also denoted in-sequence.

In-sequence delivery is an efficient method which saves the number of handshaking messages (acknowledge signals) being transmitted over a non-perfect channel. Since the method generally attempts to keep synchronism, it is well adapted to non-time critical services, such as web-browsing.

The in-sequence delivery however, may come to a halt; either if transmitted packets are not received or if transmitted acknowledge messages by the receiving entity are not received by the transmitting entity. The latter is generally attempted to be avoided by using stall avoidance procedures, namely I) Timer based stall avoidance: and II) Window based stall avoidance, as well as MAC-hs reset. These procedures have been further explained in WO2008/007170.

Problems with Existing Solutions

In a scenario where 3GPP HSDPA is rolled out, spots will likely exist where no 3GPP HSDPA coverage is available. Examples of such areas are train tunnels and motorway tunnels.

Assume a case where a user entity is receiving data via HSDPA and that the following situation occurs:

The RNC has outstanding data, meaning that data has been transmitted but not yet acknowledged by the UE, but no pending data to transmit. Assume also that the RNC has a poll_timer active, meaning that the RNC expects that a STATUS message from the UE shall arrive and discover whether or not all outstanding data was correctly received or not.

The Node-B has both outstanding and pending data to transmit, e.g. Node-B has received data from the RNC and is "halfway" in its transmission procedure.

Assume now that the end user drives in to a tunnel and that radio coverage is lost.

If the time it takes to regain radio coverage is long enough, then the following is assumed to occur:

Node-B will discard all its outstanding data plus pending data after numerous retransmissions. TSN will increase as for successful MAC-hs transmissions despite the absence of feedback from the UE.

Node-B will after this occasion not perform any retransmissions.

The poll_timer in the RNC will expire. This triggers a retransmission of e.g. last PDU sent. The poll_timer will be restarted.

Data will be received at Node-B, which will schedule new MAC-hs transmission(s) and succeeding retransmissions. Data will however be discarded since no radio coverage exists with the UE.

At the MAC-hs UE side the T1 timer may have been started which at expiration will deliver data to RLC layer, that may trigger a transmission of a STATUS message. We assume here that the transmission of such a message fails due to the lost radio coverage, but a success will not change the behavior below. It is noted that under certain channel conditions a mixture of the above events may occur.

The 2 last bullets will be executed again until radio coverage is regained . . . which we assume now . . . and the following occurs:

Node-B has success with its transmission and data will be processed by UE reordering entity.

Dependent on whether the received TSN is outside the receiver window, three scenarios, illustrated in FIG. 1, in which next expected TSN=57 and highest received HR=1, (receiver window RECW=32), may occur:

Scenario A) The incoming PDU in the MAC-hs user entity is outside the receiver window (TSN=2 . . . TSN=33):

The receiver window will be updated and a T1 timer may be started if TSN < > next_expected_tsn. At expiration of the T1 timer or immediately if TSN=next_expected_tsn MAC-hs, data will be delivered to RLC layer.

The RLC layer at the UE will discover the Poll flag in the RNC PDU, and detect the presence of lost RNC PDUs. A STATUS message will be sent to RNC.

The RNC will detect the STATUS message indicating the reception failure of numerous RNC PDUs. A retransmission of these will occur and the poll_timer will be restarted. If these retransmissions have success we have now corrected the erroneous condition caused by the lost radio access.

Scenario B) The TSN is within receiver window and >=next_expected_tsn (TSN=57 . . . TSN=1):

The scenario is similar to scenario A except that the receiver window will be unchanged.

Scenario C) The TSN is within receiver window and <next_expected_tsn (TSN=34 . . . TSN=56) (Worst case scenario)

Data will be discarded by MAC-hs

The Poll_timer at RNC will expire and a new retransmission will occur.

In most cases when the time to regain radio coverage is much longer than the T1 timer in the UE, Scenario B will not occur since the T1 timer would have expired such that the following possible scenario, shown in FIG. 1a occurs.

It can be seen here that the time it takes for the RNC to understand that PDUs have been lost, depends on the poll_timer interval, the T1 recovery time at the UE and whether or not the TSN is within receiver window. In scenario C above, it may as a worst case take receive_window_size*poll_timer until lost data is discovered by the RLC layer. We can conclude that it may take long time.

SUMMARY

It is first object of the invention to provide an enhanced stall avoidance procedure, which in a more optimized manner prevents situations in which the transmission between a transmitting entity and a receiving entity tend to stall.

According to the invention this object has been accomplished by method for operating a receiver entity (RX) adapted for receiving on a given channel (HS-SCCH) and acknowledging (ACK) the reception of packet data units (PDU) from a transmitter entity (TX) according to an automatic repeat request process, the method being based on in sequence delivery of packet data units from a first protocol layer (MAC) to a higher protocol layer (RLC) in the receiver entity (RX).

A receiver window of fixed size (RECW) is used in the receiver entity, the receiver window pertaining to a sequence of packet data units to be received; the receiver window is defined as the interval of sequence numbers ranging from the highest received sequence number (HR) minus the receiver window size plus one to the highest received sequence number (HR-RECW+1, HR); and wherein a next expected sequence number (NE) is registered reflecting the next sequence number to be delivered (171; 176_3) to the higher protocol (RLC) layer in order to maintain the in-sequence delivery; the method comprising the steps of monitoring (10, 11) whether the identity (11) of the receiver entity (RX) can be decoded for an incoming packet data unit;

monitoring (13) whether an automatic repeat request process is decoded correctly for the incoming packet data unit; and if so, reading (14) the transmit sequence number (TSN) of the incoming packet data unit;

performing a normal reordering procedure (170, 171, 180, 176_1-176_5, 181), in which a received packet having a sequence number corresponding to the next expected sequence number is delivered to the higher protocol layer (RLC) or a timer based stall avoidance (300-302,177,178,176_6, 176_7) procedure, or a window based stall avoidance procedure (172-175), said avoidance procedures allowing the receiver window to move forward despite a next expected sequence number not being received from the transmitter.

The method furthermore comprising the steps of deriving an accumulated quality parameter (T2, T3) pertaining to the packet data being communicated from the transmitter entity to the receiver entity;

comparing the accumulated quality parameter (T2, T3) with a predetermined threshold value (T2L, T3L);

if the accumulated quality parameter meets predefined criteria (15, 8, 28), moving the receiver window, whereby the highest received value (HR) is forwarded to a position corresponding to the received sequence number (M)(16,173); and setting (16) the next expected (NE) value in the receiver window forward to a position corresponding to a rear position of the window determined by the window size (RECW)(16, 175).

The above object has also been accomplished by a receiver entity (RX, 30) adapted for receiving on a given channel (HS-SCCH) and acknowledging (ACK) the reception of packet data units (PDU) from a transmitter entity (TX) according to an automatic repeat request process.

The receiver entity is comprising a decoding unit (33), automatic repeat request processors (36_1 . . . 36 . . . j); reordering and re-assembly queues (39), an upper protocol layer (31); and a receiver entity feedback processor (38).

The reception is being based on in-sequence delivery of packet data units from a first protocol layer (MAC) to a higher protocol layer (RLC) in the receiver entity (RX).

The receiver entity is comprising a receiver window of fixed size (RECW) stored in the reordering and re-assembly queue (39), the receiver window pertaining to a sequence of packet data units to be received; the receiver window being defined as the interval of sequence numbers ranging from the highest received sequence number (HR) minus the receiver window size plus one to the highest received sequence number (HR-RECW+1, HR); and wherein a next expected sequence number (NE) is registered reflecting the next sequence number to be delivered (171; 176_3) to the higher protocol (RLC) layer (31) in order to maintain the in-sequence delivery; the receiver entity (30) comprising a control message handler (32) being adapted to carry out the steps of monitoring (10, 11) whether the identity (11) of the receiver entity (RX) can be decoded for an incoming packet data unit;

monitoring (13) whether an automatic repeat request process is decoded correctly for the incoming packet data unit; and if so, reading (14) the transmit sequence number (TSN) of the incoming packet data unit;

performing a normal reordering procedure (170, 171, 180, 176_1-176_5, 181), in which a received packet having a sequence number corresponding to the next expected sequence number is delivered to the higher protocol layer (RLC) or a timer based stall avoidance (300-302,177,178,176_6, 176_7) procedure, or a window based stall avoidance procedure (172-175), said avoidance procedures allowing the receiver window to move forward despite a next expected sequence number not being received from the transmitter.

The receiver entity is being adapted to deriving an accumulated quality parameter (T2, T3) pertaining to the packet data being communicated from the transmitter entity to the receiver entity.

The control message handler (32) is comparing the accumulated quality parameter (T2, T3) with a predetermined threshold value (T2L, T3L);

if the control message handler (32) establishes that the accumulated quality parameter meets predefined criteria (15, 8, 28), moving the receiver window, whereby the highest received value (HR) is forwarded to a position corresponding to the received sequence number (M)(16, 173); and setting (16) the next expected (NE) value in the receiver window forward to a position corresponding to a rear position of the window determined by the window size (RECW)(16, 175).

According to the invention, it is observed that the sequential nature of e.g. TCP transmissions may suffer if duplicate RLC frames occur due to MAC-hs Scheduler/MAC-e Scheduler transmission faults. Such duplicates affect negatively the end user TCP throughput. The invention lessens the occurrences of duplicates.

A majority of 3GPP related internet traffic concerning the UEs is likely to be downlink related, e.g. a UE starting a file download when using a web application such as Internet Explorer. Data will subsequently flow predominantly in the downlink direction compared to the uplink direction as seen from the Node-B point of view. With an increasing amount of always-on applications such as push email, situations will become usual where no data is relayed neither in uplink or downlink as seen from Node-B, and where data will first come from the network side downlink to the UE. This increases the frequency of the case C scenario described above after a period of no reception. The enhanced stall avoidance procedures according to the invention provides better stall avoidance properties while obviating RLC duplicates being transmitted, especially for the benefit of above described traffic scenarios.

BRIEF DESCRIPTION OF THE DRAWINGS

FIG. 14 shows an exemplary comparative scenario according to the invention and the prior art.

DETAILED DESCRIPTION OF PREFERRED EMBODIMENTS OF THE INVENTION

According to the invention, in a first embodiment, the UE utilizes a novel accumulated quality parameter that, when it meets predefined criteria, leads to a modified recovery procedure.

Figure 4:
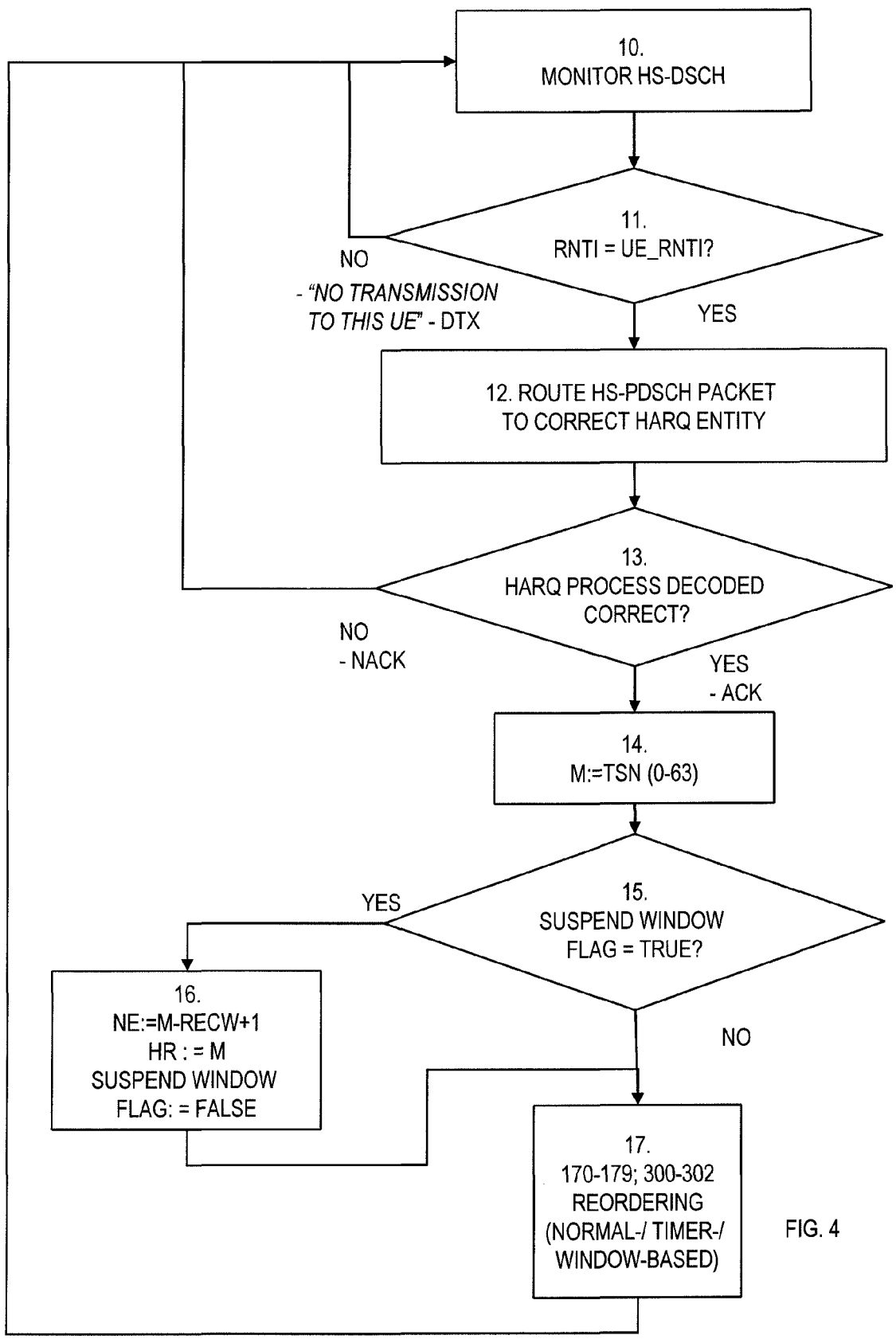
FIG. 4 shows a first flow diagram pertaining to a first and a second embodiment of the invention.
Figure 5:
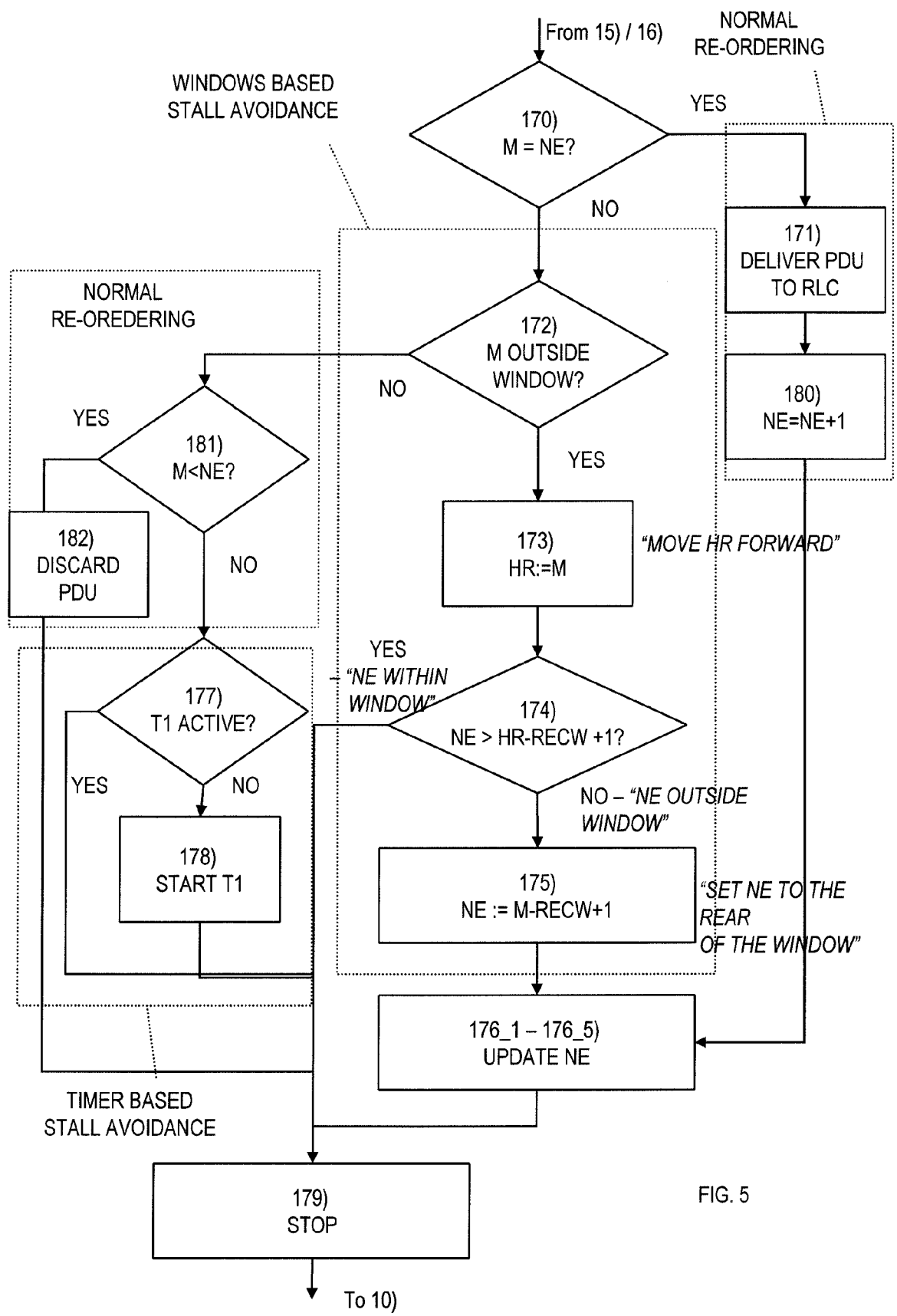
FIG. 5 shows further details of FIG. 4.
Figure 6:
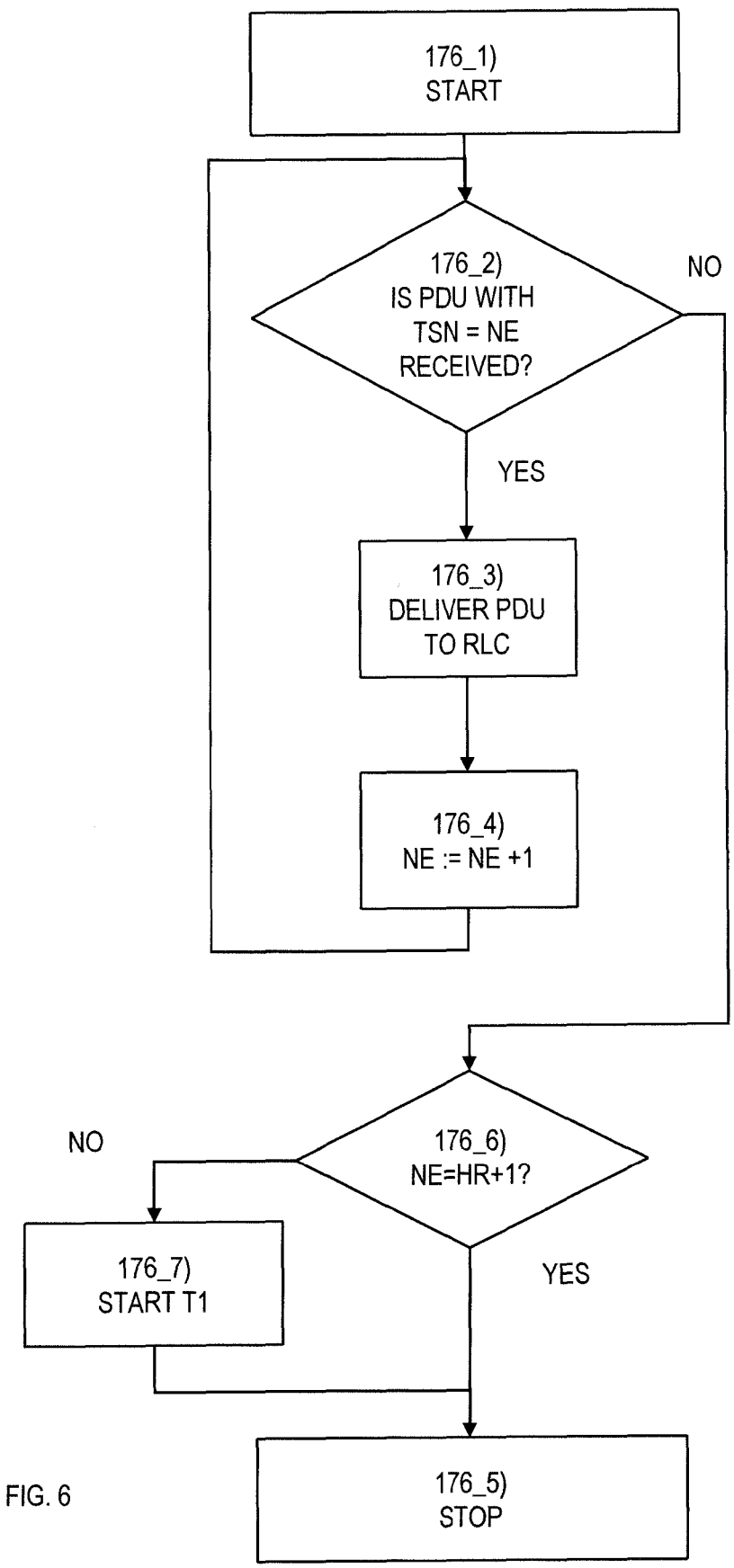
FIG. 6 shows further details of FIG. 5.
Figure 7:
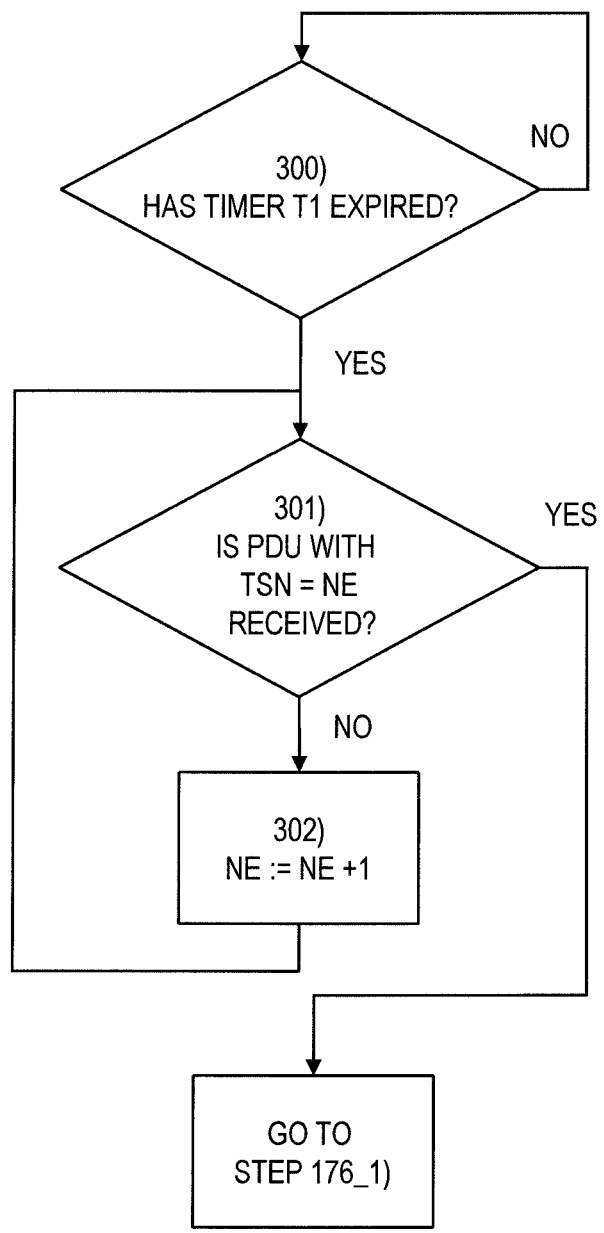
FIG. 7 shows further details of FIG. 4.

The invention shall now be explained with respect to FIGS. 4, 5, 6, 7 and 8, which illustrate first and a second routines running concurrently in the UE. It is noted that FIG. 4 shows a first flow diagram pertaining to a first embodiment of the invention, and that FIG. 5 shows further details of FIG. 4, while FIG. 6 shows further details of FIG. 5. Moreover, FIG. 7 shows further details of FIG. 4.

It should moreover be noted that the resulting functionality expressed in flow diagrams 5, 6 and 7, by way of example may correspond to one implementation of the window based and timer based stall procedures made to comply with prior art requirements, although the specific methods shown may not be directly known from the prior art.

Figure 8:
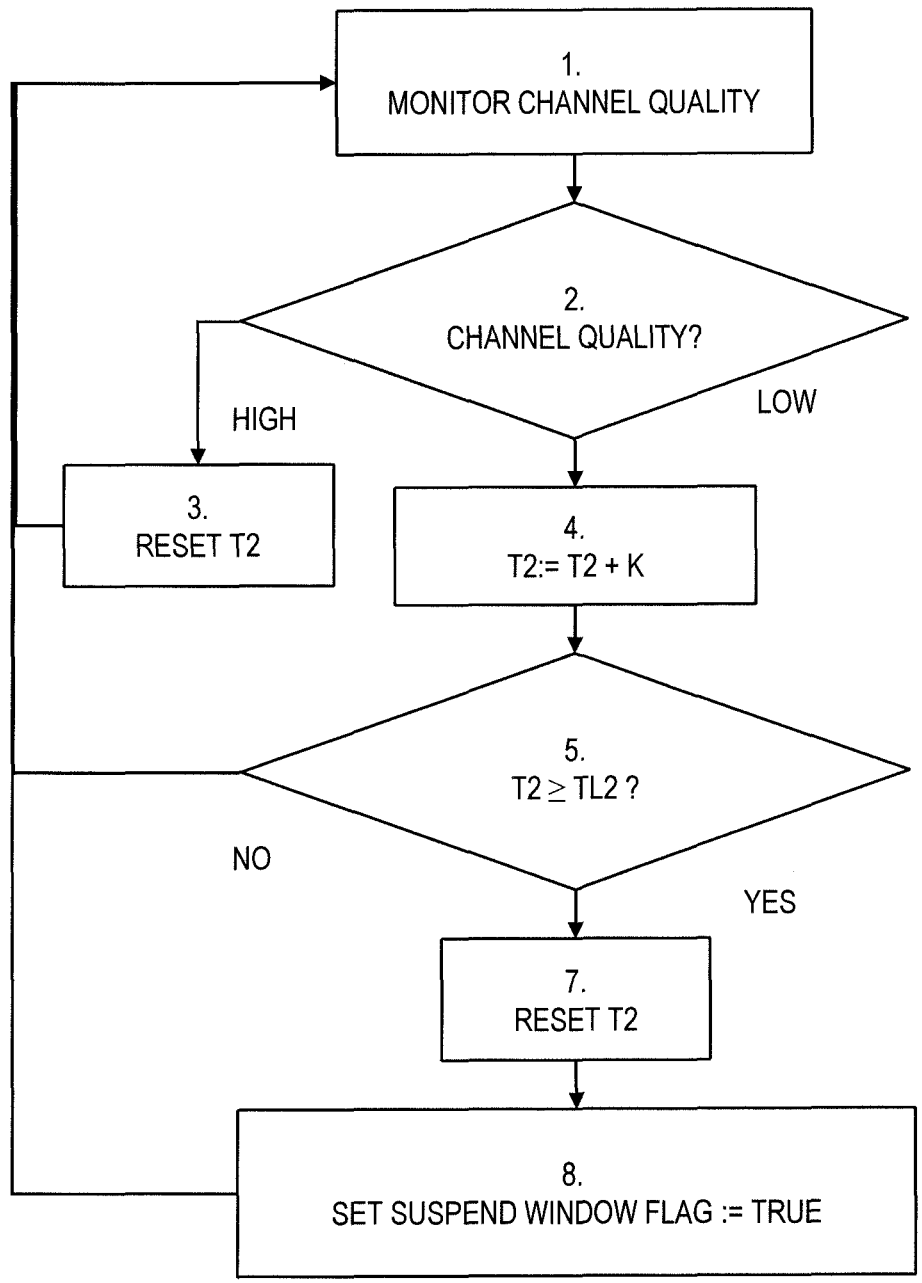
FIG. 8 shows a flow diagram pertaining to the first embodiment of the invention running parallel with the FIG. 4 diagram.

It should also be understood that the flow diagram of FIG. 4 and the flow diagram of FIG. 8 constitute two routines according to the first embodiment of the invention which is intended to run parallel in the receiving entity according to the invention.

In the given example, the user entity is a receiving entity and the Node B is a transmitting entity, communicating downlink packet data to the user entity.

Figure 1:
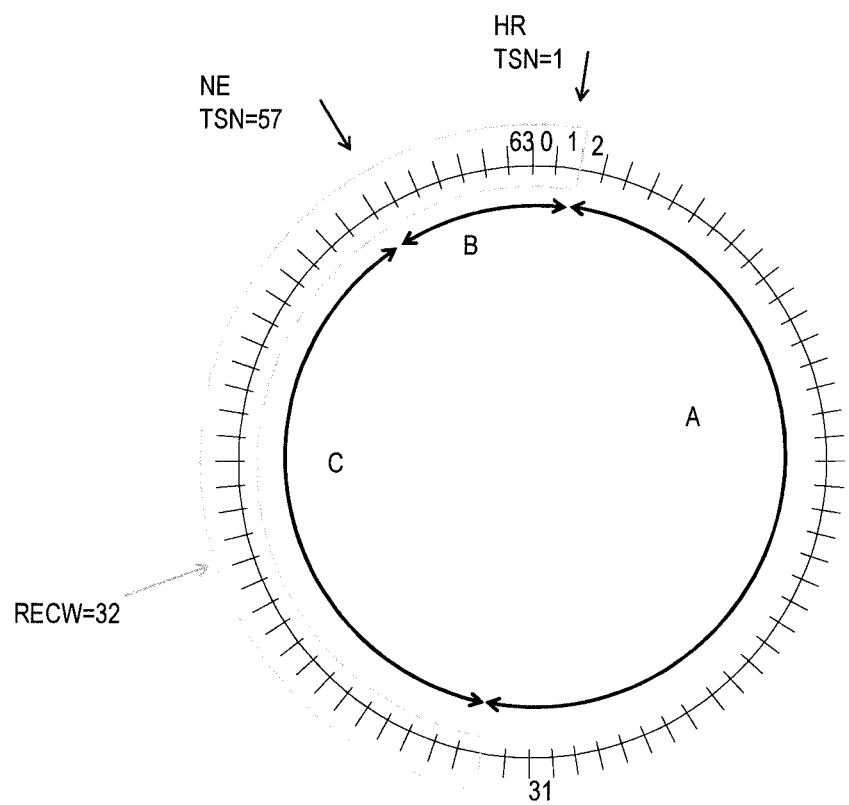
FIG. 1 shows a MAC HS window in a receiving entity in which three areas of interest A, B and C have been indicated.
Figure 1A:
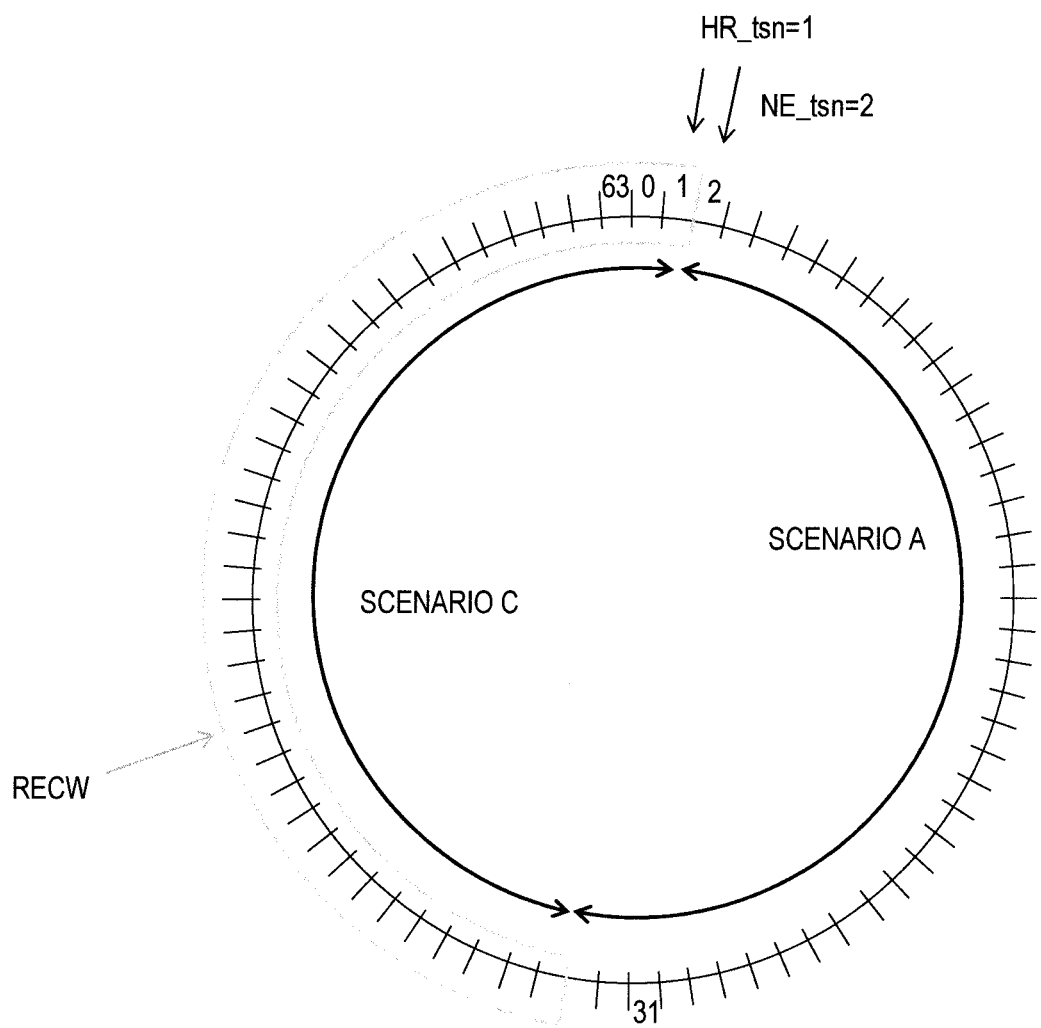
FIG. 1a shows another prior art scenario.

The first routine, shown in FIG. 4 is carried out. According to step 10, the HS-DSCH channel quality is monitored. The HS-PDSCH (High Speed Downlink Shared Channel) and the HS-SCCH (High Speed Shared Control Channel) are comprised within the HS-DSCH notion and at least one of these channels may be monitored. The channel quality may also be performed, e.g. by measuring the CPICH channel signal strength with respect to a minimum predefined quality threshold or CPICH signal to noise ratio or by measuring HS-DSCH channel block errors or a combination thereof. It will further be appreciated that when determining HS-DSCH channel quality, averaging methods may also be utilized that even out fluctuations in channel quality levels. If the RNTI parameter is identified as being equal to the particular UE, which identifies the given UE, step 11, a transmission to the given UE is expected in HS-PDSCH. If not, there is no indication of any transmission to the given UE—this state being denoted DTX—and the routine goes to step 10, if yes in step 11, the routine proceeds, to step 12, where the HS-PDSCH is routed to correct the HARQ entity. In step 13, it is questioned whether the HARQ process is decoded correctly. If no, corresponding to a NACK (not acknowledged) message, return to step 10; if yes, corresponding to an ACK (acknowledged) message, a parameter M is set equal to the received transmit sequence number (TSN), which has a value between 0 and 63 as shown in FIG. 1. In step 15, it is investigated whether the suspend window flag, which may be set in the second routine, to be described below, is true. If not, a normal re-ordering procedure is carried out in the UE, that is, at least a normal reordering procedure or a timer based stall avoidance procedure or a windows based stall avoidance procedure is carried out. If the answer is yes to step 15, the UE sets, in step 16, the next expected parameter NE to parameter M minus the window (RECW) size plus 1 and the highest received, HR, is set to the value of parameter M, i.e. the window is moved forward so as to include the actual received packet with the given TSN. Thereafter, the suspend window flag is set to false, and the routine goes to step 17, in which steps 170-179, 180, 181, 182 shown in FIG. 5, including steps 176_1-176_5 shown in FIG. 6 and steps 300-302, shown in FIG. 7 are carried out. Those steps will be explained later.

Concurrently with the above routine, a second routine, shown in FIG. 8, is performed. In step 1, the HS-DSCH channel quality is monitored. If the HS-DSCH channel quality is of a low quality, step 2, a T2 parameter is updated by adding the value K, step 4. If the answer is no, that is, the quality is high, the parameter T2 is reset, step 3, and the routine goes to step 1. Continuing from step 4, it is further investigated, step 5, if the parameter has reached limit TL2, if no the routine goes back to step 1, if yes, parameter T2 is reset in step 7 and the set suspend window flag is set true, step 8.

In other words there is provided: . . .

A method for operating a receiver entity (RX) adapted for receiving on a given channel (HS-SCCH) and acknowledging (ACK) the reception of packet data units (PDU) from a transmitter entity (TX) according to an automatic repeat request process, the method being based on in-sequence delivery of packet data units from a first protocol layer (MAC) to a higher protocol layer (RLC) in the receiver entity (RX).

A receiver window of fixed size (RECW) is used in the receiver entity, the receiver window pertaining to a sequence of packet data units to be received; the receiver window is defined as the interval of sequence numbers ranging from the highest received sequence number (HR) minus the receiver window size plus one to the highest received sequence number (HR-RECW+1, HR); and wherein a next expected sequence number (NE) is registered reflecting the next sequence number to be delivered (171; 176_3) to the higher protocol (RLC) layer in order to maintain the in-sequence delivery.

The method comprises the steps of monitoring (10, 11) whether the identity (11) of the receiver entity (RX) can be decoded for an incoming packet data unit;

monitoring (13) whether an automatic repeat request process is decoded correctly for the incoming packet data unit; and if so, reading (14) the transmit sequence number (TSN) of the incoming packet data unit.

According to the method there is performed a normal reordering procedure (170, 171, 180, 176_1-176_5, 181, 182), in which a received packet having a sequence number corresponding to the next expected sequence number is delivered to the higher protocol layer (RLC) or a timer based stall avoidance (300-302,177,178,176_6, 176_7) procedure, or a window based stall avoidance procedure (172-175), said avoidance procedures allowing the receiver window to move forward despite a next expected sequence number not being received from the transmitter.

The method furthermore comprises the steps of deriving an accumulated quality parameter (T2, T3) pertaining to the packet data being communicated from the transmitter entity to the receiver entity;

comparing the accumulated quality parameter (T2, T3) with a predetermined threshold value (T2L, T3L);

if the accumulated quality parameter meets predefined criteria (15, 8, 28), moving the receiver window, whereby the highest received value (HR) is forwarded to a position corresponding to the received sequence number (M)(16,173); and setting (16) the next expected (NE) value in the receiver window forward to a position corresponding to a rear position of the window determined by the window size (RECW)(16, 175).

The steps carried out in FIG. 5 will now be further explained. Coming from step 15 or 16, FIG. 4, in step 170 it is examined whether the sequence number M equals the next expected sequence number NE, step 170. If yes, the PDU is delivered to the RLC layer, step 171, and the next expected sequence number is increased with one, step 181.

These steps constitute normal reordering steps. If the answer to 170, was no, it is further investigated whether the received sequence number is outside the receiver window, step 172. If this is not the case, it is continued with step 181 where it is further investigated whether the received PDU is lower than the next expected sequence number, 181. If this is the case, PDU's are discarded, 182, the latter two steps also constituting the normal re-ordering procedure. If, on the other hand, in step 172, the received sequence number M was outside the window, the highest received, HR, is set equal to the received sequence number, 173, and it is subsequently investigated whether NE is larger than HR-receiver window, RECW plus one, in other words, whether next expected is outside the receiver window, step 174, or within the receiver window. If yes, the routine goes to step 179, stop, if no, next expected is set equal to M minus the receiver window size, RECW, plus one, step 175, in other words, NE is set to the rear of the window. Subsequently, NE is updated according to steps 176_1-176_5, shown in FIG. 6, and the procedure goes to stop, step 179.

If the answer to question in step 181, was no, the routine investigates in step 177 whether timer T1 is active, if yes, proceed to step 179, stop, if no, timer T1 is started, step 178. Steps 177 and 178 form part of the timer based stall avoidance procedure, which has been further elucidated in FIG. 7, which shows a procedure running in parallel with the one shown in FIG. 5. In FIG. 7, in step 300, it is tested whether timer T1 has expired, if no, the routine loops back to step 300, if yes, in step 301, it is investigated whether the received PDU has a transmit sequence number which equals the next expected. If yes the procedure goes to step 176_1; if no, in step 302, the next expected sequence number is increased by one.

The update NE procedure step 176_1-176_5 mentioned above, comprises the steps of start, 176_1, is PDU with TSN=NE received?, step 176_2. If yes the PDU is delivered to the RLC layer, step 176_3, and the next expected is increased by one, step 176_4. If no, in step 176_2, it is tested whether next expected equals highest received plus 1, step 176_6; if yes, the procedure stops, step 176_5; and if no, timer T1 is started, step 176_7.

It should be noted that the normal re-ordering procedure, the timer based stall avoidance procedure and the window based stall avoidance procedure, may be implemented as fulfilling 3GPP standards.

Second Embodiment

Figure 9:
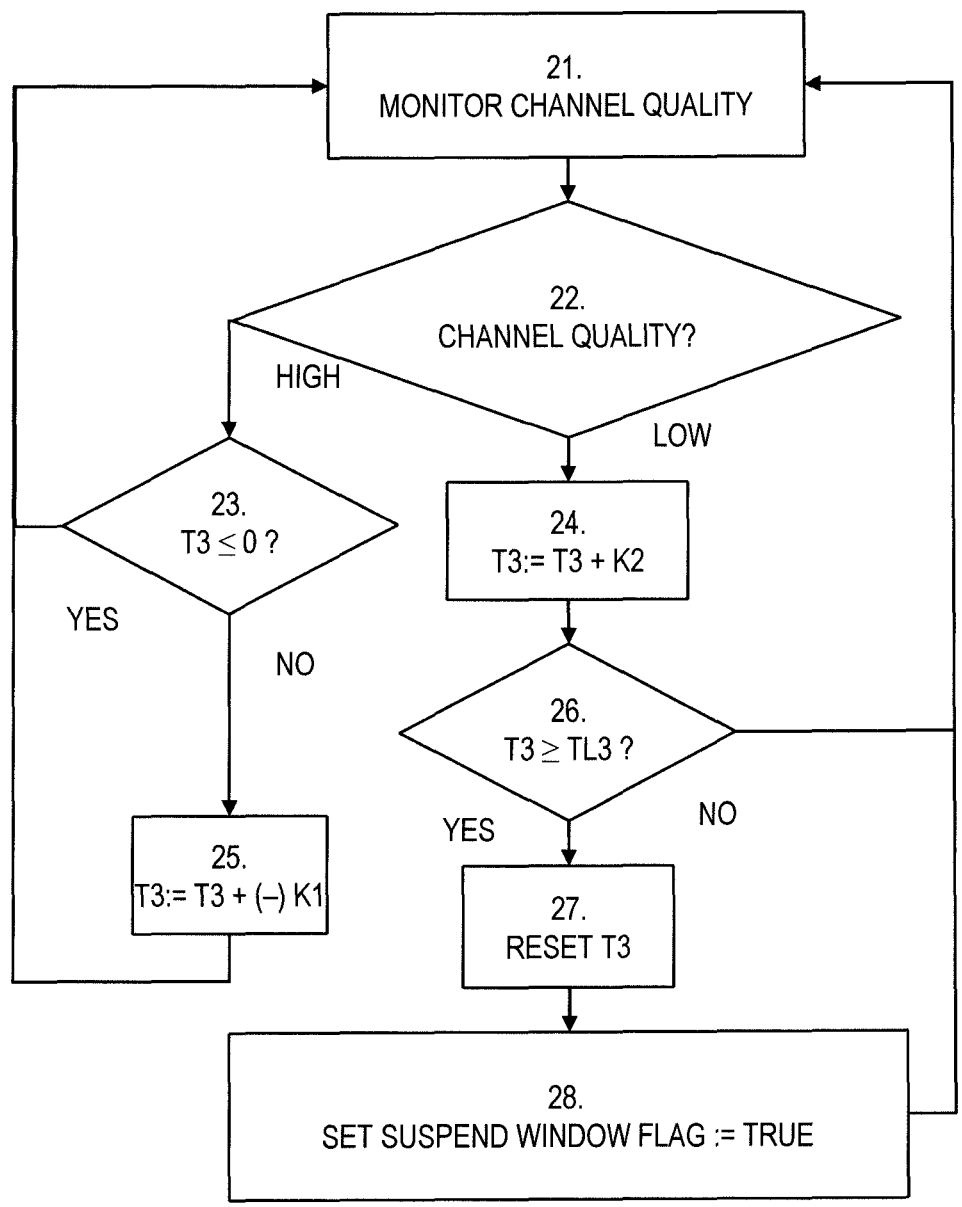
FIG. 9 shows a flow diagram pertaining to the second embodiment of the invention running parallel with the FIG. 4 diagram.

A second embodiment of the second routine of the invention is shown in the flow diagram of FIG. 9. In comparison with the flow diagram pertaining to the first embodiment of the second routine shown in FIG. 8, the steps of monitoring the HS-DSCH channel quality 21, examining the channel quality as being a high level or a low level 22, the updating of the parameter 24, the threshold testing 26, the reset 27, the set suspend flag 28, are equivalent with those steps shown in FIG. 8.

In the second embodiment, the updating of a parameter T3 is such that if the channel quality is low, a first value K2 is used for the updating whereas if the channel quality is high a second, preferably, negative value K1 (emphasized as being negative in FIG. 9) is used for updating the parameter, step 25.

The numerical values of K1 and K2 may be equal or different.

Figure 12:
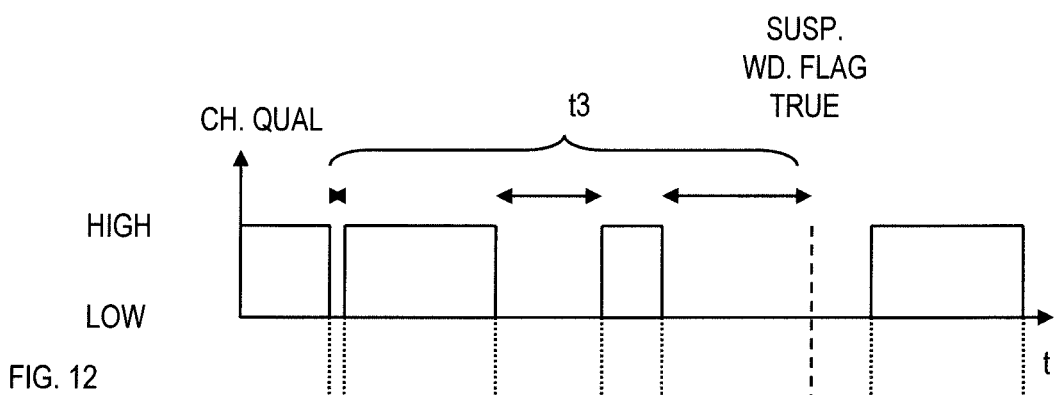
FIG. 12-13 shows details relating to an example of the second embodiment.
Figure 13:
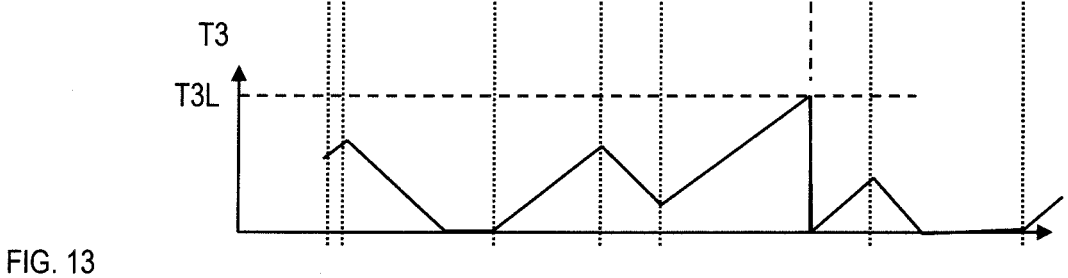

An exemplary scenario is given in FIGS. 12 and 13, wherein it shown that the parameter increases and decreases, respectively, as the channel quality fluctuates, while keeping within upper and lower boundaries as determined by steps 23 and 26. When then accumutated quality parameter reaches a threshold T3L, the suspend window flag is set according to step 28. It is seen that, if the user entity experiences a period of inferior quality, interspersed with smaller periods of a sufficiently high quality, HS-DSCH may be deemed, on average during a given period, to have suffered such considerable disturbances that—and as effectuated according to the second embodiment—it is more feasible to trigger the enhanced stall avoidance procedure and move forward the window so as to take advantage of possible lately received packets from the transmitter.

First and Second Embodiments

According to FIGS. 8 and 9 it is seen that it applies for both the embodiments of the second routine it applies that, the step of determining that the accumulated quality parameter meets predefined criteria (15; T2L, T3L) comprises the steps of continuously monitoring (1, 21) a channel quality (CPICH_Q) pertaining to the packet data being communicated from the transmitter entity to the receiver entity;

updating (3, 4, 24, 25) an accumulated quality parameter (T2, T3) at intervals;

determining that the accumulated quality parameter (T2, T3) meets the predefined criteria if the accumulated quality parameter (T2, T3) reaches a predefined threshold (T2L, T3L)(5, 26).

The accumulated quality parameter (T2, T3) may be updated with a first value (K; K2) if the channel quality is defined as having a level corresponding to a predefined low level (4, 24).

Moreover, the accumulated quality parameter (T2, T3) may be reset (7, 27) after the accumulated quality parameter has reached the predefined threshold (7, 26).

Advantageously, when the accumulated quality parameter does not meet the predefined criteria (15), normal reordering or timer based stall avoidance or window based stall avoidance (17, 170-180, 300-302) is performed.

According to a preferred embodiment, the monitored automatic repeat request (13) process is a hybrid automatic repeat request (HARQ).

Moreover, the method may pertain to a high speed packet downlink access (HSDPA), and the first protocol layer may be a media access control layer for high speed packet downlink access (MAC-hs), involving hybrid automatic repeat request (HARQ) and the second protocol layer is a radio link control layer (RLC).

The normal reordering procedure (170, 171, 180, 176_1-176_5, 181, 182) comprises the step of upon detecting (11, 13) a data packet unit corresponding to the next expected sequence number (NE) (170)—delivering (171, 176_3) the received data packet to the upper protocol layer (RLC) in the receiver and updating the next expected (NE)(180, 176_4) and highest received (HR) sequence number thereby moving the receiver window forward.

discarding of received data packet received within receiver window with but with transmit sequence number lower than next expected sequence number (181, 182).

The timer based stall avoidance procedure (300-302,177, 178, 176_5, 176_6,176_7) may comprise the steps of upon expiration of a first timer (300) moving the next expected sequence number (NE) to the first packet sequence number for which data has been received (301, 302);

the timer being activated (176_6, 176_7, 178) when the highest received (HR) sequence number being greater than the next expected (NE) transmit sequence number.

The window based stall avoidance procedure (c) (172-175) may comprise the steps of upon receiving a data packet with a sequence number falling outside the receiver window (172), forwarding the receiver window (173) and setting the highest received sequence number (HR) to the received packet, —updating the next expected sequence number (NE) to the rear position of the moved window (175) and delivering (176_1, 176_5) packet data units to the higher protocol layer (RLC).

An update next expected sequence number routine (176_1-176_5) may be carried out, in which if a received packet data unit equals the next expected sequence number (176_2), the received packet and a packet data unit and consecutive received PDU's (176_3, 176_4) are delivered to the higher protocol layer.

Figure 10:
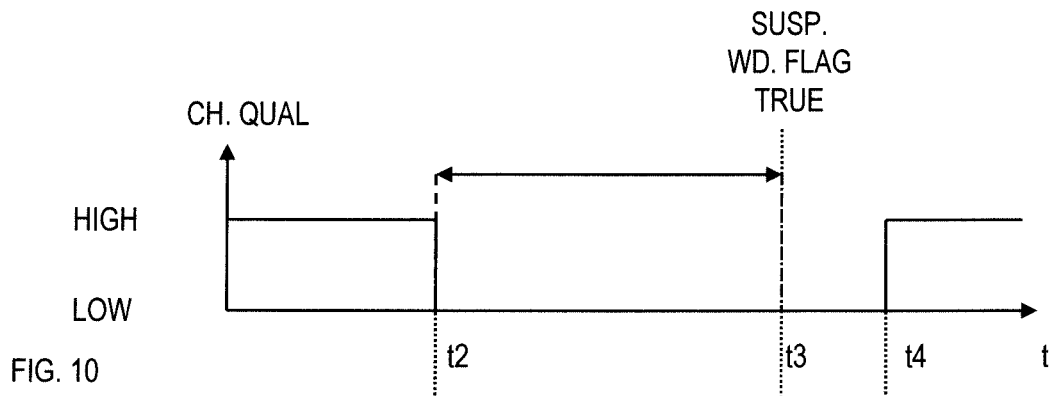
FIG. 10-11 shows details relating to an example of the first embodiment.
Figure 11:
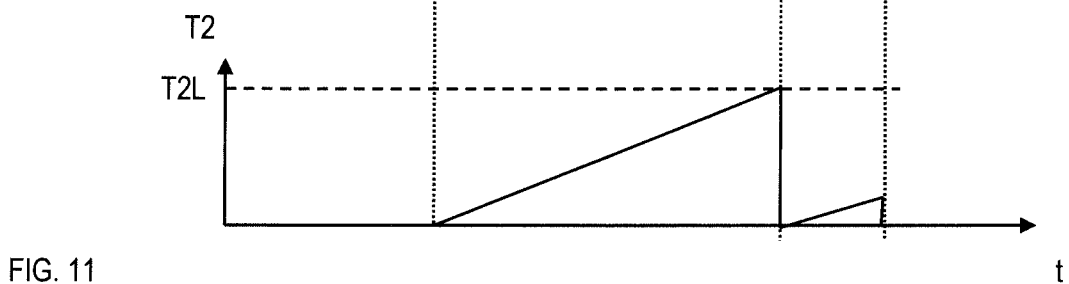

The effects of carrying out the first and second routine as explained above, is illustrated by the example shown in FIGS. 10 and 11, where the UE experiences a drop in channel quality, for instance due to traveling into a tunnel with no HSDPA reception.

During time t2-t3, the reception quality is poor and the T2 parameter increases until limit T2L where the suspend window flag is set true, according to step 8. The quality is continuously poor during t3-t4, and parameter T2 is increasing again, but the connection is re-established at t4 and parameter T2 is reset, step 3.

In FIG. 14, the effects are further illustrated by comparing a thought prior art device with a user entity performing the above routines according to the invention, subject to the same exemplary conditions. We assume initially that both user entities successfully decode packet data units with TSN 0 and TSN 1, such that next expected NE is 2 and the highest received sequence number is 1 at instance 4, for both the method according to the invention and the first embodiment of the invention.

It is seen that the after a period of poor transmission quality, instances 6-9, a number of DTX (discontinued) occurrences occurs. At instance 10, a packet data unit with sequence number 40 fails to be decoded (DTX). However, when the quality is reestablished for sequence number 41, at instance 12, the prior art receiver entity example will not issue sequence number 41 to upper layers since it is within the receiver window, NE=2; HR=1(bottom of window), (window extending to TSN=32). Instead, the user entity in the prior art example will discard the packet data unit with TSN equaling 41.

According to the first embodiment of the invention, the sequence number 41 (=M) will set the upper border for the new reception window to HR:=M, as defined in step 16, shown in FIG. 4, due to the suspend window being set to true, since the channel quality was low for the given period times 6-10. Normal timer based stall avoidance reordering will now continue, which will reassure that packet data unit with TSN equal to 41 will be delivered to the RLC layer.

It will be appreciated that packet data units with TSN within the new receiver window, i.e. 10-41, may be transmitted by Node B concurrent which subsequently also will be delivered to the RLC layer.

The present invention may advantageously be utilized in connection with a known function denoted Continuous Packet Connectivity (CPC). CPC allows a UE to restrict the downlink reception times and is mainly intended for applications which involve transmitting small packets either continuously (e.g. VoIP) or intermittently (e.g. MSN and push email). The CPC is configured by the RNC but can be turned on and off by Node-B. Using CPC, the UE can increase its battery lifetime by reducing its power consumption in between such downlink reception times. While using CPC, the UE does not have to leave the HS-DSCH/E-DCH state in order to preserve power in the case of inactivity, but can remain in the HS-DSCH/E-DCH state and be able to respond much faster to incoming network initiated traffic (e.g. web messaging services, such as MSN messenger). CPC is briefly described in "High Speed Packet Access Evolution—Concept and Technologies," Peisa, J.; Wager, S.; Sagfors, M.; Torsner, J.; Goransson, B.; Fulghum, T.; Cozzo, C.; Grant, S. Vehicular Technology Conference, 2007. VTC2007-Spring. IEEE 65th, Volume, Issue, 22-25 Apr. 2007 Page(s): 819-82.

Base Station and User Entity

Figure 2:
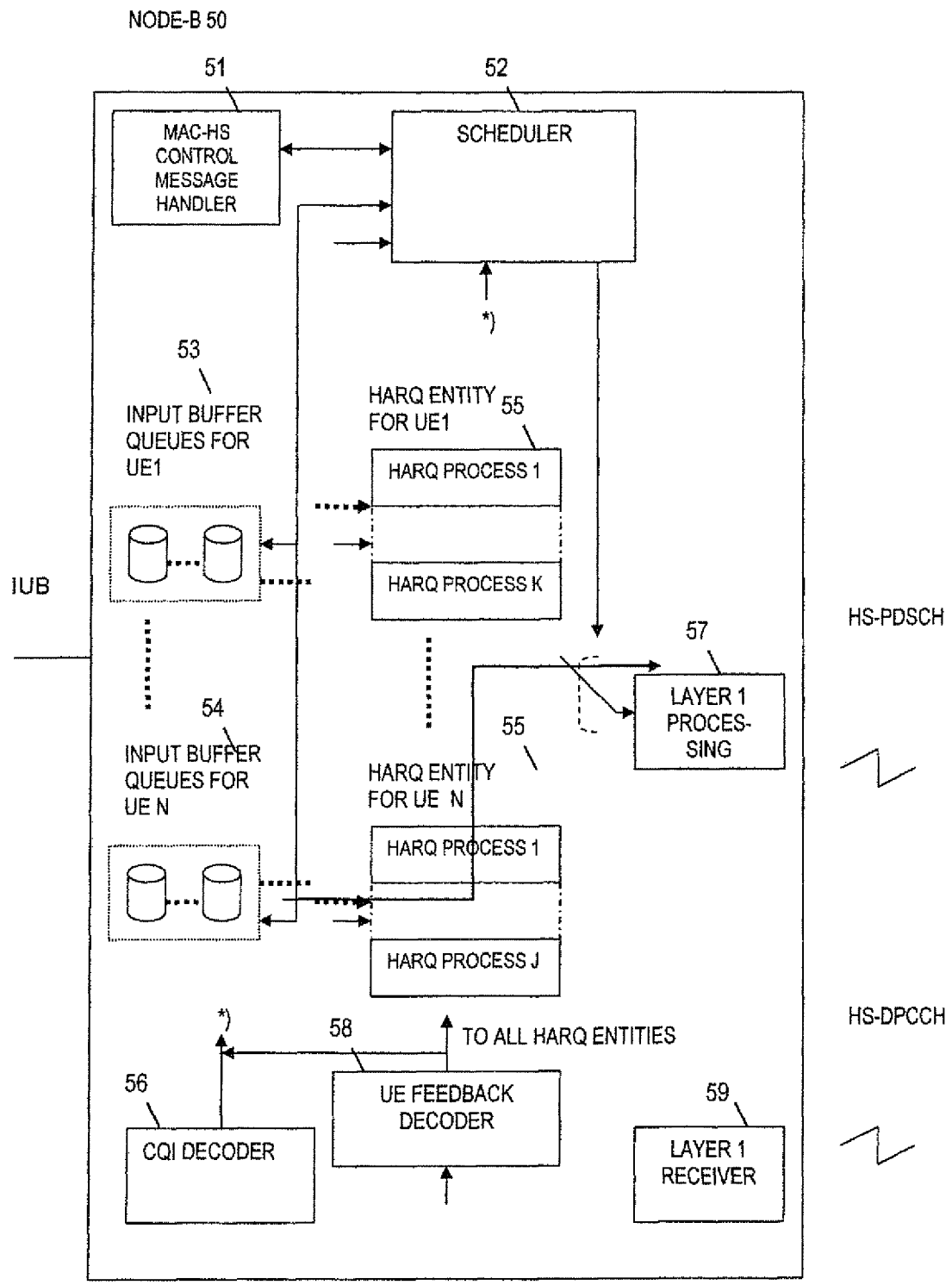
FIG. 2 shows a Node B implementation according to the invention.
Figure 3:
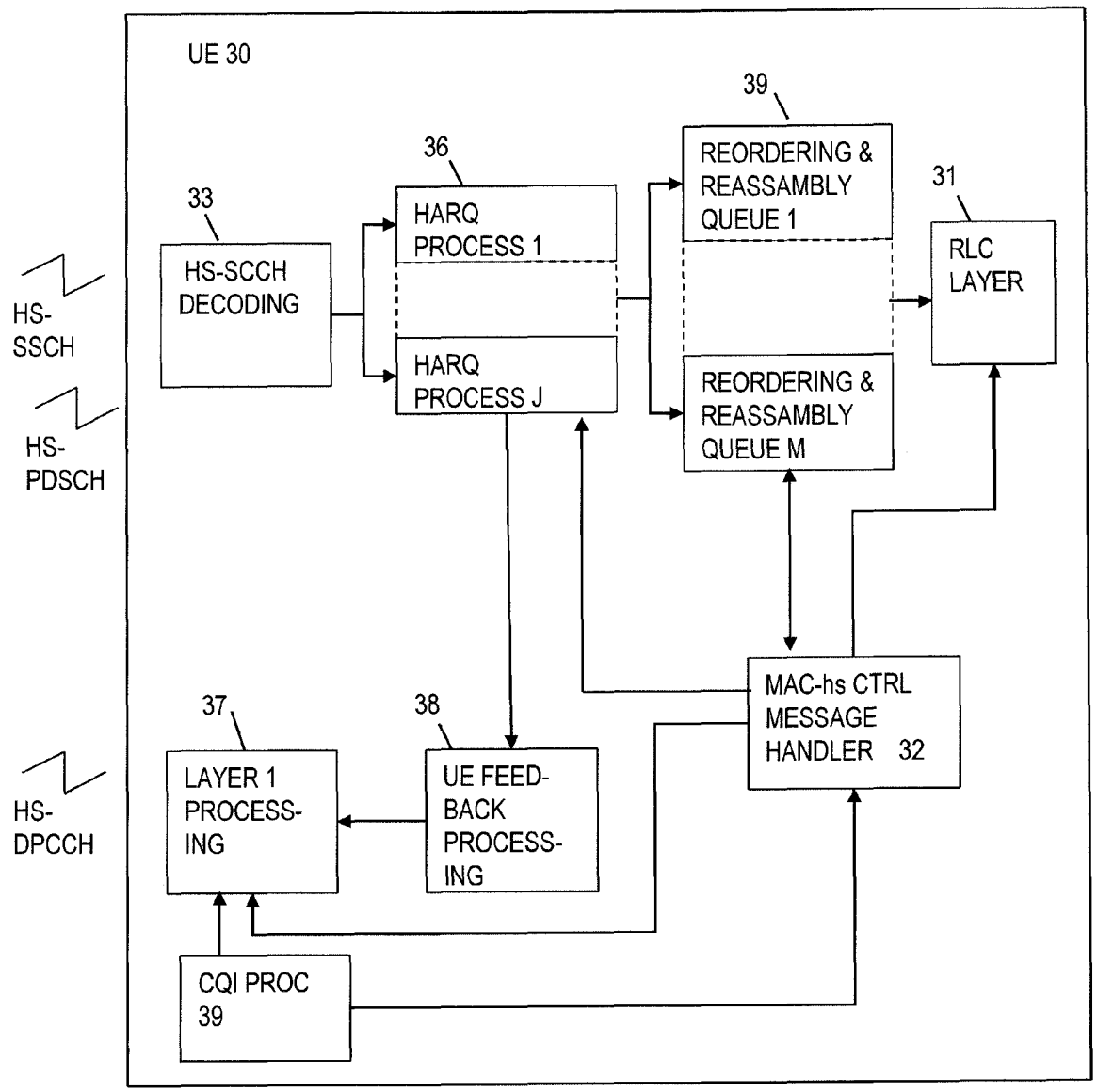
FIG. 3 shows a user entity implementation according to the invention.

In FIGS. 2 and 3, diagram of a base station set (Node B) and a user entity (UE), respectively, are shown.

The base station set, Node B, comprises a MAC-hs control message handler 51, a scheduler 52, a number of input buffers 53, 54 storing segments of data streams pertaining to individual user entities, UE1-UEn, corresponding to a number of HARQ processes 1 ... k, 1 ... j for handling simultaneous transmissions to several UE's 1 ... N, 55 that is, for each user entity as well, Layer 1 processing means 57 for transferring data from respective HARQ processes. The base station moreover comprises a CQI decoder 56, a user entity (UE) feedback decoder 58 and a layer 1 receiver 59.

Each HARQ process in a given user entity is mirrored in Node B, and corresponds to a given data stream which is received by a particular user entity. As explained above, more data streams may be used by the user simultaneously corresponding to one application or more simultaneous applications running on the user entity apparatus, possibly with different QoS requirements. Moreover, consecutive data may be transmitted for the same user entity, the consecutive transmission belonging to different HARQ processes.

Moreover, Node B comprises at least one specific input buffer queue 54 dedicated to a corresponding set of HARQ processes.

It is noted that the base station merely may perform standard tasks as specified by 3GPP; hence a standard Node B can be used in connection with the user entity according to the invention. The Node B is shown here for illustratively showing the features of the user entity according to the invention.

In FIG. 3, a user entity (MAC) arrangement according to the invention is shown comprising HS-SCCH decoding means 33, for decoding the downlink HS-SSCH and the HS-PDSCH channel, the arrangements consisting of a number J of HARQ processes 36; a number M of reordering and disassembly queues 39 and a RLC (Radio Link Control) layer means 31. Moreover, there is provided UE (User Entity) feedback processing means 38 and layer 1 processing 37 for providing feed-back on the HS-DPCCH channel.

The overall control is taken care of by a MAC-hs control and message handler 32. This handler decides on the conditions for effectuating the stall avoidance procedures according to the invention.

The reordering queue distribution function routes the MAC-hs PDU's to the correct reordering buffer based on a Queue ID. The reordering entity reorders received MAC-hs PDU's according to the received TSN (transmit sequence number). MAC-hs PDU's with ascending TSN's (MAC hs Transmit Sequence Numbers) are delivered to the disassembly function. To recover from erroneous conditions when MAC-hs PDU are missing, the same avoidance handling as described in 3GPP TS 25.321-11.6.2, that is, the reordering and window based stall avoidance, may be used as also specified in step 17 FIG. 4. Moreover, the additional stall avoidance functionality as specified in step 16, FIG. 4 and in steps 1-8 FIG. 8 or steps 21-28 FIG. 9 are implemented in the user entity according to the invention. There is one reordering entity for each Queue ID configured at the UE. The disassembly entity is responsible for the disassembly of MAC-hs PDU's. When a MAC-hs header is removed, the MAC-d PDU's are extracted and any padding bits are removed. Then the MAC-d PDUs are delivered to the higher (RLC) layer. These features may be carried out as described in 3GPP TS 25.321-11.6.2.3.

In other words there is provided:

A receiver entity (RX, 30) adapted for receiving on a given channel (HS-SCCH) and acknowledging (ACK) the reception of packet data units (PDU) from a transmitter entity (TX) according to an automatic repeat request process, the receiver entity comprising a decoding unit (33), automatic repeat request processors (36_1 ... 36 ... j); reordering and re-assembly queues (39), an upper protocol layer (31); and a receiver entity feedback processor (38).

The reception is being based on in-sequence delivery of packet data units from a first protocol layer (MAC) to a higher protocol layer (RLC) in the receiver entity (RX), the receiver entity comprising a receiver window of fixed size (RECVV) stored in the reordering and re-assembly queue (39), the receiver window pertaining to a sequence of packet data units to be received; the receiver window being defined as the interval of sequence numbers ranging from the highest received sequence number (HR) minus the receiver window size plus one to the highest received sequence number (HR-RECW+1, HR); and wherein a next expected sequence number (NE) is registered reflecting the next sequence number to be delivered (171; 176_3) to the higher protocol (RLC) layer (31) in order to maintain the in-sequence delivery.

The receiver entity (30) comprises a control message handler (32) being adapted to carry out the steps of monitoring (10, 11) whether the identity (11) of the receiver entity (RX) can be decoded for an incoming packet data unit;

monitoring (13) whether an automatic repeat request process is decoded correctly for the incoming packet data unit; and if so, reading (14) the transmit sequence number (TSN) of the incoming packet data unit;

performing a normal reordering procedure (170, 171, 180, 176_1-176_5, 181), in which a received packet having a sequence number corresponding to the next expected sequence number is delivered to the higher protocol layer (RLC) or a timer based stall avoidance (300-302, 177, 178, 176_6, 176_7) procedure, or a window based stall avoidance procedure (172-175), said avoidance procedures allowing the receiver window to move forward despite a next expected sequence number not being received from the transmitter.

The receiver entity is being adapted to deriving an accumulated quality parameter (T2, T3) pertaining to the packet data being communicated from the transmitter entity to the receiver entity.

The control message handler (32) is comparing the accumulated quality parameter (T2, T3) with a predetermined threshold value (T2L, T3L);

if the control message handler (32) establishes that the accumulated quality parameter meets predefined criteria (15, 8, 28), it is effectuating a move of the receiver window, whereby the highest received value (HR) is forwarded to a position corresponding to the received sequence number (M)(16,173); and it is setting (16) the next expected (NE) value in the receiver window forward to a position corresponding to a rear position of the window determined by the window size (RECW)(16, 175).

The step of determining that the accumulated quality parameter meets predefined criteria (15; T2L, T3L) can involve that the control message handler (32) is continuously monitoring (1, 21) a channel quality (CPICH_Q) pertaining to the packet data being communicated from the transmitter entity to the receiver entity;

updating (3, 4, 24, 25) an accumulated quality parameter (T2, T3) at intervals;

determining that the accumulated quality parameter (T2, T3) meets the predefined criteria if the accumulated quality parameter (T2, T3) reaches a predefined threshold (T2L, T3L)(5, 26).

The accumulated quality parameter (T2, T3) may be updated with a first value (K; K2) if the channel quality is defined as having a level corresponding to a predefined low level (4, 24).

The accumulated quality parameter (T2, T3) may be reset (7, 27) after the accumulated quality parameter has reached the predefined threshold (7, 26).

When the accumulated quality parameter does not meet the predefined criteria (15), the receiver entity is performing normal reordering or timer based stall avoidance or window based stall avoidance (17, 170-180, 300-302).

In the present example, the monitored automatic repeat request (13) process is a hybrid automatic repeat request (HARQ). Moreover, the method pertains to a high speed packet downlink access (HSDPA), and the first protocol layer is a media access control layer for high speed packet downlink access (MAC-hs), involving hybrid automatic repeat request (HARQ). The second protocol layer is a radio link control layer (RLC).

Moreover, the quality of the channel monitored is a HS-DSCH channel and the transmitting entity is a Node B.

The normal reordering procedure (170, 171, 180, 176_1-176_5, 181, 182) may comprise the step of upon detecting (11, 13) a data packet unit corresponding to the next expected sequence number (NE) (170)—delivering (171, 176_3) the received data packet to the upper protocol layer (RLC) in the receiver and updating the next expected (NE)(180, 176_4) and highest received (HR) sequence number thereby moving the receiver window forward. The normal reordering also comprise the steps of discarding of received data packets received within the receiver window having transmit sequence numbers lower than next expected sequence number (181).

The timer based stall avoidance procedure (300-302,177, 178, 176_5, 176_6,176_7) may comprise the steps of upon expiration of a first timer (300) moving the next expected sequence number (NE) to the first packet sequence number for which data has been received (301, 302);

the timer being activated (176_6, 176_7, 178) when the highest received (HR) sequence number being greater than the next expected (NE) transmit sequence number.

The window based stall avoidance procedure (c) (172-175) may comprise the steps of upon receiving a data packet with a sequence number falling outside the receiver window (172), forwarding the receiver window (173) and setting the highest received sequence number (HR) to the received packet, —updating the next expected sequence number (NE) to the rear position of the moved window (175) and delivering (176_1, 176_5) packet data units to the higher protocol layer (RLC).

An update next expected sequence number routine (176_1-176_5) may be carried out in the control message handler (32), in which if a received packet data unit equals the next expected sequence number (176_2), the received packet and a packet data unit and consecutive received PDU's (176_3, 176_4) are delivered to the higher protocol layer.

The invention claimed is:

1. A method for operating a receiver entity adapted for receiving on a given channel and acknowledging the reception of packet data units from a transmitter entity according to an automatic repeat request process, the method being based on in-sequence delivery of packet data units from a first protocol layer to a higher protocol layer in the receiver entity, wherein a receiver window of fixed size is used in the receiver entity, the receiver window pertaining to a sequence of packet data units to be received; the receiver window is defined as the interval of sequence numbers ranging from the highest received sequence number minus the receiver window size plus one to the highest received sequence number; and wherein a next expected sequence number is registered reflecting the next sequence number to be delivered to the higher protocol layer in order to maintain the in-sequence delivery; the method comprising:

monitoring whether the identity of the receiver entity can be decoded for an incoming packet data unit;

monitoring whether an automatic repeat request process is decoded correctly for the incoming packet data unit; and if so, reading the transmit sequence number of the incoming packet data unit;

performing:
  a normal reordering procedure, in which a received packet having a sequence number corresponding to the next expected sequence number is delivered to the higher protocol layer;
  a timer based stall avoidance procedure; or
  a window based stall avoidance procedure, the avoidance procedures allowing the receiver window to move forward despite a next expected sequence number not being received from the transmitter;

deriving an accumulated quality parameter pertaining to the packet data being communicated from the transmitter entity to the receiver entity;

comparing the accumulated quality parameter with a predetermined threshold value; and if the accumulated quality parameter meets predefined criteria, moving the receiver window, whereby the highest received value is forwarded to a position corresponding to the received sequence number; and setting the next expected value in the receiver window forward to a position corresponding to a rear position of the window determined by the window size.

2. The method according to claim 1 wherein determining that the accumulated quality parameter meets predefined criteria comprises:

continuously monitoring a channel quality pertaining to the packet data being communicated from the transmitter entity to the receiver entity;

updating the accumulated quality parameter at intervals; and determining that the accumulated quality parameter meets the predefined criteria if the accumulated quality parameter reaches a predefined threshold.

3. The method according to claim 1, wherein the accumulated quality parameter is updated with a first value if the channel quality is defined as having a level corresponding to a predefined low level.

4. The method according to claim 1, wherein the accumulated quality parameter is reset after the accumulated quality parameter has reached the predefined threshold.

5. The method according to claim 3, wherein the accumulated quality parameter is updated with a second value if the channel quality is having a level corresponding to a predefined high level.

6. The method according to claim 1, wherein, when the accumulated quality parameter does not meet the predefined criteria, performing normal reordering or timer based stall avoidance or window based stall avoidance.

7. The method according to claim 1, wherein the monitored automatic repeat request process is a hybrid automatic repeat request.

8. The method according to claim 1, wherein the method pertains to a high speed packet downlink access, and wherein the first protocol layer is a media access control layer for high speed packet downlink access, involving hybrid automatic repeat request and the second protocol layer is a radio link control layer.

9. The method according to claim 1, wherein the quality of the channel monitored is a high speed downlink shared channel.

10. The method according to claim 1, wherein the transmitting entity is a Node B and the receiving entity is a user entity.

11. The method according to claim 1, wherein the normal reordering procedure comprises:
upon detecting a data packet unit corresponding to the next expected sequence number, delivering the received data packet to the upper protocol layer in the receiver and updating the next expected and highest received sequence number thereby moving the receiver window forward; and
discarding received data packets received within the receiver window with transmit sequence numbers lower than the next expected sequence number,
wherein the timer based stall avoidance procedure comprises:
upon expiration of a first timer moving the next expected sequence number to the first packet sequence number for which data has been received; and
the timer being activated when the highest received sequence number being greater than the next expected transmit sequence number;
wherein the window based stall avoidance procedure comprises:
upon receiving a data packet with a sequence number falling outside the receiver window, forwarding the receiver window and setting the highest received sequence number to the received packet; and
updating the next expected sequence number to the rear position of the moved window and delivering packet data units to the higher protocol layer.

12. The method according to claim 11, wherein an update of the next expected sequence number routine is carried out, in which if a received packet data unit equals the next expected sequence number, the received packet data unit and consecutive received PDU's are delivered to the higher protocol layer.

13. A receiver entity adapted for receiving on a given channel and acknowledging the reception of packet data units from a transmitter entity according to an automatic repeat request process,
the receiver entity comprising a decoding unit, automatic repeat request Processors, reordering and re-assembly queues, an upper protocol layer, and a receiver entity feedback processor;
wherein the reception is being based on in-sequence delivery of packet data units from a first protocol layer to a higher protocol layer in the receiver entity,
the receiver entity comprising a receiver window of fixed size stored in the reordering and re-assembly queue, the receiver window pertaining to a sequence of packet data units to be received; the receiver window being defined as the interval of sequence numbers ranging from the highest received sequence number minus the receiver window size plus one to the highest received sequence number; and wherein a next expected sequence number is registered reflecting the next sequence number to be delivered to the higher protocol layer in order to maintain the in-sequence delivery; the receiver entity comprising a control message handler being adapted to carry out the steps of:
monitoring whether the identity of the receiver entity can be decoded for an incoming packet data unit;
monitoring whether an automatic repeat request process is decoded correctly for the incoming packet data unit; and if so, reading the transmit sequence number of the incoming packet data unit;
performing:
a normal reordering procedure, in which a received packet having a sequence number corresponding to the next expected sequence number is delivered to the higher protocol layer;
a timer based stall avoidance procedure; or
a window based stall avoidance procedure, the avoidance procedures allowing the receiver window to move forward despite a next expected sequence number not being received from the transmitter,
wherein the receiver entity is further adapted to;
derive an accumulated quality parameter pertaining to the packet data being communicated from the transmitter entity to the receiver entity;
compare, at the control message handler, the accumulated quality parameter with a predetermined threshold value; and
if the control message handler establishes that the accumulated quality parameter meets predefined criteria, moving the receiver window, whereby the highest received value is forwarded to a position corresponding to the received sequence number; and setting the next expected value in the receiver window forward to a position corresponding to a rear position of the window determined by the window size.

14. The receiver entity according to claim 13, wherein determining that the accumulated quality parameter meets predefined criteria involves the control message handler
continuously monitoring a channel quality pertaining to the packet data being communicated from the transmitter entity to the receiver entity;
updating the accumulated quality parameter at intervals; and
determining that the accumulated quality parameter meets the predefined criteria if the accumulated quality parameter reaches a predefined threshold.

15. The receiver entity according to claim 13, wherein the accumulated quality parameter is updated with a first value if the channel quality is defined as having a level corresponding to a predefined low level.

16. The receiver entity according to claim 13, wherein the accumulated quality parameter is reset after the accumulated quality parameter has reached the predefined threshold.

17. The receiver entity according to claim 15, wherein the accumulated quality parameter is updated with a second value if the channel quality is having a level corresponding to a predefined high level.

18. The receiver entity according to claim 13, herein, when the accumulated quality parameter does not meet the predefined criteria, performing normal reordering or timer based stall avoidance or window based stall avoidance.

19. The receiver entity according to claim 13, wherein the monitored automatic repeat request process is a hybrid automatic repeat request.

20. The receiver entity according to claim 13, wherein the quality of the channel monitored is a HS-SCCH channel.

21. The receiver entity according to claim 13, wherein the transmitting entity is a Node B.

22. The receiver entity according to claim 13 wherein the normal reordering procedure comprises:
- upon detecting a data packet unit corresponding to the next expected sequence number, delivering the received data packet to the upper protocol layer in the receiver and updating the next expected and highest received sequence number thereby moving the receiver window forward; and
- discarding of received data packets received within receiver window with transmit sequence numbers lower than next expected sequence number, wherein the timer based stall avoidance procedure comprises;
- upon expiration of a first timer, moving the next expected sequence number to the first packet sequence number for which data has been received; activating the timer being when the highest received sequence number is greater than the next expected transmit sequence number wherein the window based stall avoidance procedure comprises:
- upon receiving a data packet with a sequence number falling outside the receiver window, forwarding the receiver window and setting the highest received sequence number to the received packet, updating the next expected sequence number to the rear position of the moved window and delivering packet data units to the higher protocol layer.

23. The receiver entity according to claim 13, wherein an update next expected sequence number routine is carried out in the control message handler, in which if a received packet data unit equals the next expected sequence number, the received packet data unit and consecutive received PDU's are delivered to the higher protocol layer.

24. The method according to claim 1, wherein the quality of the channel monitored is a common pilot channel.

* * * * *

UNITED STATES PATENT AND TRADEMARK OFFICE
CERTIFICATE OF CORRECTION

PATENT NO.        : 8,542,607 B2
APPLICATION NO.   : 12/991709
DATED             : September 24, 2013
INVENTOR(S)       : Lindskog et al.

Page 1 of 1

It is certified that error appears in the above-identified patent and that said Letters Patent is hereby corrected as shown below:

In the Specification

Column 10, Line 49, delete "accumutated" and insert -- accumulated --, therefor.

Column 14, Line 3, delete "(RECVV)" and insert -- (RECW) --, therefor.

In the Claims

Column 17, Line 55, in Claim 13, delete "Processors," and insert -- processors, --, therefor.

Column 18, Line 23, in Claim 13, delete "transmitter," and insert -- transmitter; --, therefor.

Column 18, Line 24, in Claim 13, delete "adapted to;" and insert -- adapted to: --, therefor.

Column 18, Line 41, in Claim 14, delete "handler" and insert -- handler: --, therefor.

Column 18, Line 61, in Claim 18, delete "herein," and insert -- wherein, --, therefor.

Signed and Sealed this
Sixth Day of May, 2014

Michelle K. Lee
*Deputy Director of the United States Patent and Trademark Office*